United States Patent
Lao et al.

(10) Patent No.: US 10,280,795 B2
(45) Date of Patent: May 7, 2019

(54) DEVICE FOR RECOVERING LUBRICATION OIL EJECTED BY CENTRIFUGAL EFFECT IN A TURBINE ENGINE

(71) Applicant: SAFRAN AIRCRAFT ENGINES, Paris (FR)

(72) Inventors: Jérémy Phorla Lao, Guyane (FR); Olivier Belmonte, Perthes-en-Gâtinais (FR); Clémentine Charlotte Marie Mouton, Tournan-en-Brie (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 139 days.

(21) Appl. No.: 15/618,915

(22) Filed: Jun. 9, 2017

(65) Prior Publication Data
US 2017/0356306 A1    Dec. 14, 2017

(30) Foreign Application Priority Data

Jun. 10, 2016  (FR) ..................... 16 55332

(51) Int. Cl.
| | |
|---|---|
| *F02C 7/06* | (2006.01) |
| *F01D 25/18* | (2006.01) |
| *F02C 7/36* | (2006.01) |
| *F16H 57/04* | (2010.01) |

(52) U.S. Cl.
CPC ............. *F01D 25/18* (2013.01); *F02C 7/06* (2013.01); *F02C 7/36* (2013.01); *F16H 57/0421* (2013.01); *F16H 57/0427* (2013.01); *F16H 57/0479* (2013.01); *F16H 57/0482* (2013.01); *F05D 2260/40311* (2013.01);

(Continued)

(58) Field of Classification Search
CPC .... F01D 25/18; F02C 7/06; F02C 7/36; F16H 57/0421; F16H 57/0427; F16H 57/0482
See application file for complete search history.

(56) References Cited

U.S. PATENT DOCUMENTS

| | | |
|---|---|---|
| 6,223,616 B1 | 5/2001 | Sheridan |
| 2015/0300255 A1 | 10/2015 | Gallet et al. |

FOREIGN PATENT DOCUMENTS

| | | |
|---|---|---|
| FR | 2987402 A1 | 8/2013 |
| WO | 2013/124590 A1 | 8/2013 |

OTHER PUBLICATIONS

Rapport de Recherche Preliminaire, dated Feb. 1, 2017, issued in corresponding French Application No. 1655332 filed Jun. 10, 2016, 4 pages.

*Primary Examiner* — Jason K Niesz
(74) *Attorney, Agent, or Firm* — Christensen O'Connor Johnson Kindness PLLC

(57) ABSTRACT

A device for recovering oil injected by centrifugal effect in a turbine engine, comprising a substantially circular ring around an axis, the ring comprising a first part forming a basin surrounding the axis and having an opening turned radially inward, so as to recover the oil injected radially across from the opening, and a second part forming a substantially toroidal chamber, radially open outward at a low point, so as to allow oil to escape, a passage being arranged between the basin and the chamber substantially over the entire circumference around the axis so as to cause the oil recovered by the basin to enter the chamber, wherein a rim is arranged between a radially inner bottom of the chamber and the passage, so as to contain the oil accumulating in this radially inner bottom of the chamber, and in some embodiments, at a high point.

12 Claims, 3 Drawing Sheets

(52) U.S. Cl.
CPC .... *F05D 2260/609* (2013.01); *F05D 2260/98* (2013.01); *Y02T 50/671* (2013.01)

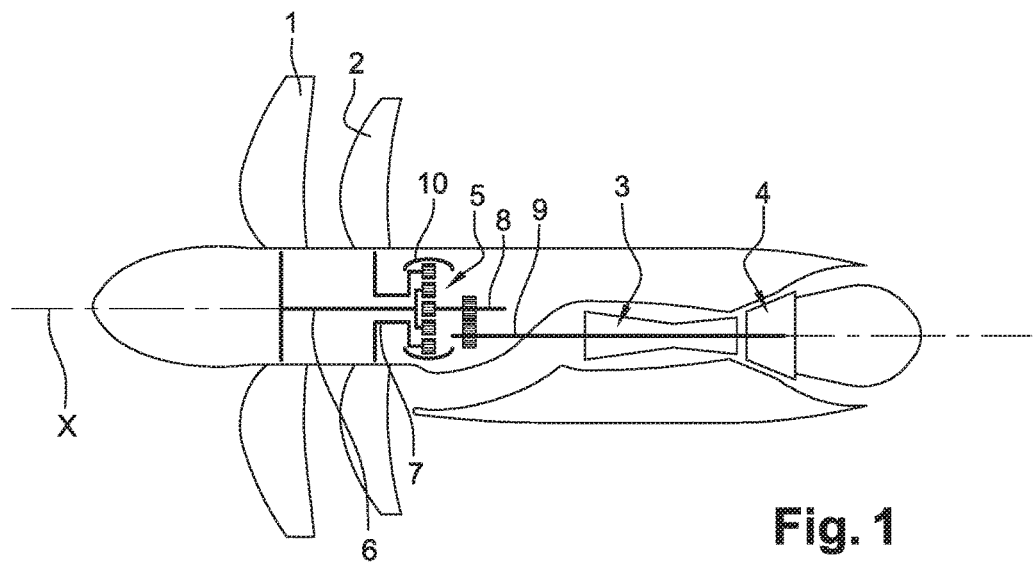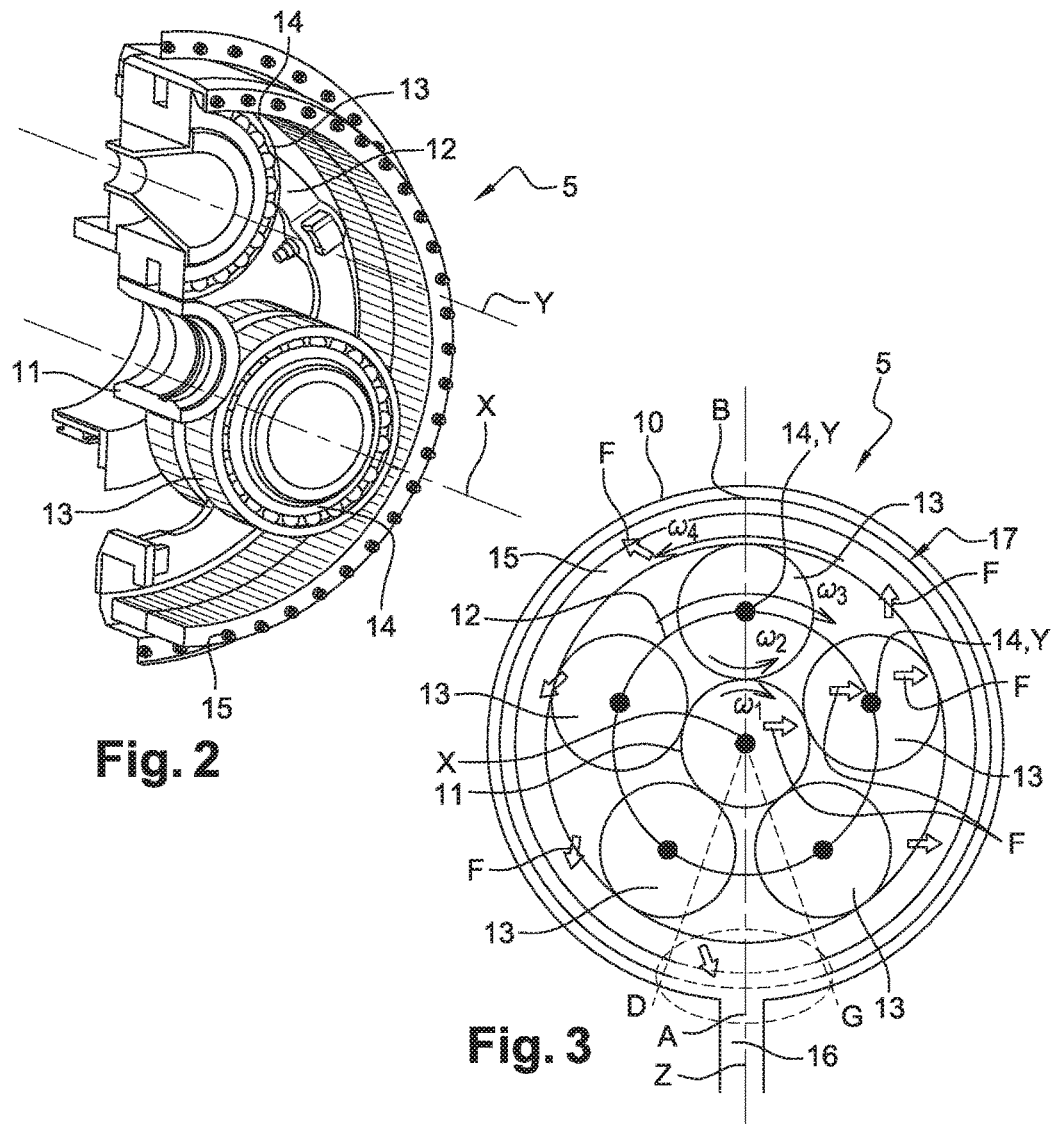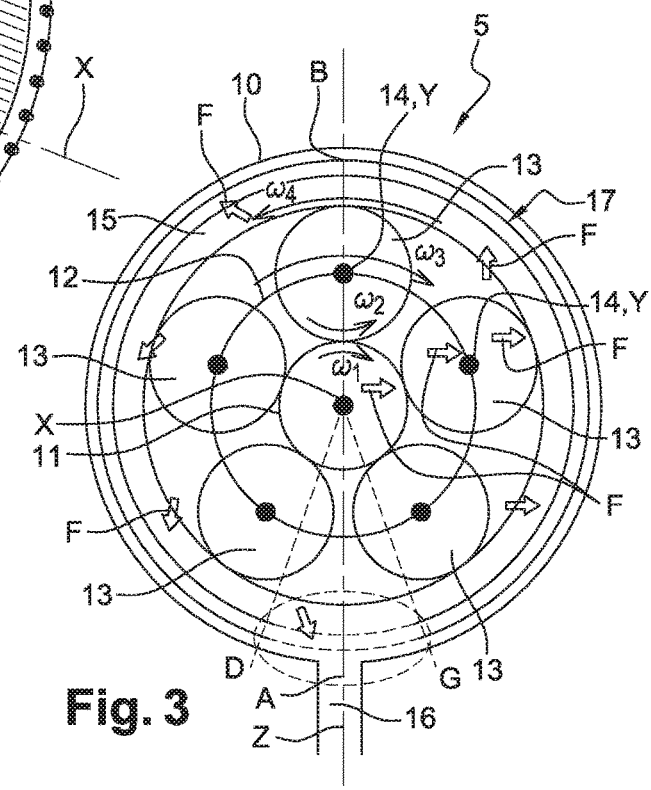
Fig. 1
Fig. 2
Fig. 3

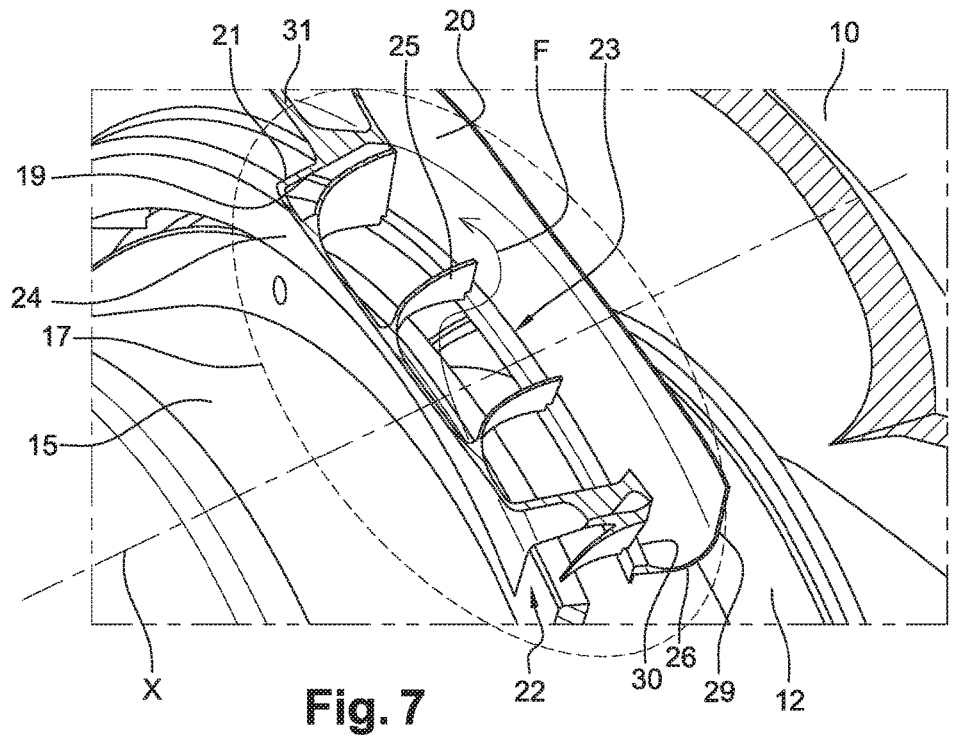
Fig. 7
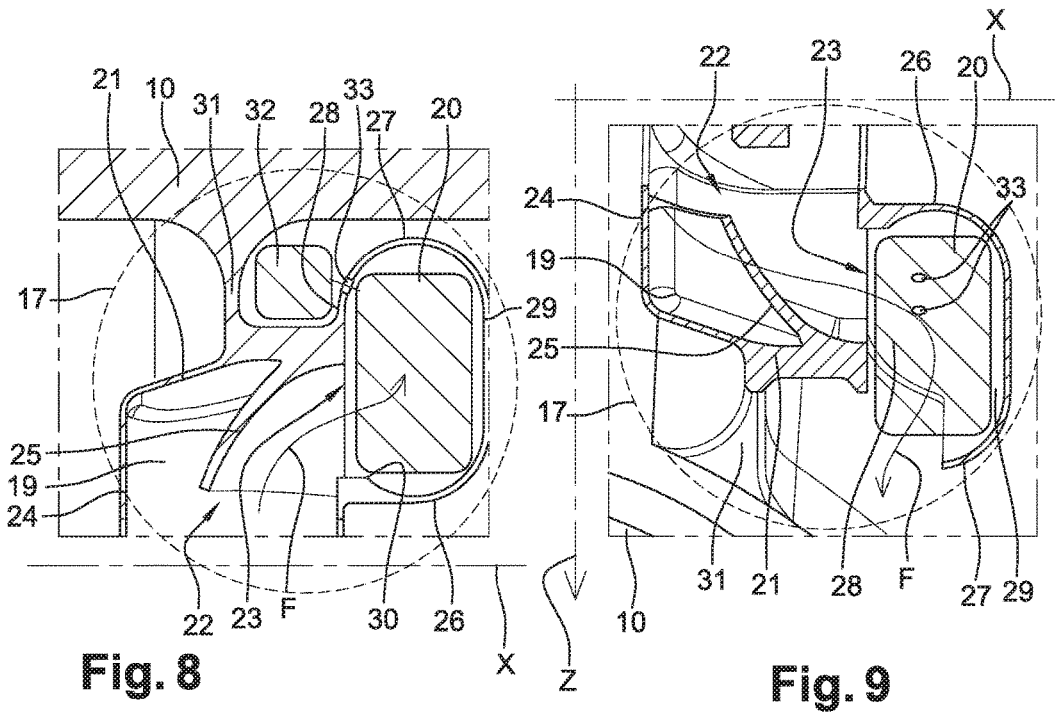
Fig. 8
Fig. 9

DEVICE FOR RECOVERING LUBRICATION OIL EJECTED BY CENTRIFUGAL EFFECT IN A TURBINE ENGINE

FIELD OF THE DISCLOSURE

The field of the present disclosure is that of aeronautic propulsion, and more particularly that of turbine engines including a rotary component, for example an epicyclic reduction gear, requiring significant lubrication.

BACKGROUND

A turbine engine driving a pair of contra-rotating propellers, for example, uses a reduction gear with an epicyclic gear train whereof the toothed outer annular gear rotates around the planet gear carrier while meshing on the planet gears. The lubrication of such equipment, all of the elements of which rotate, is a crucial aspect of its performance. If the reduction gear is not sufficiently lubricated, the friction between the teeth of the gears or at the bearings causes premature wear and decreased performance.

Since it is desirable to avoid this problem, the lubrication system is designed to send a significant oil flow rate, typically around 5000 liters per hour, to lubricate the reduction gear. The reduction gear is contained in one or several casings forming an oil enclosure comprising discharge means such as channels, which send the oil into the lubrication system. Nevertheless, if oil accumulates in the reduction gear, a so-called churning phenomenon occurs, which decreases the performance. It is therefore necessary for the oil discharge device to be sized to discharge this flow rate from the enclosure of the reduction gear.

Furthermore, the problem of mass being significant on an aircraft, it is necessary to prevent the recovery device around the reduction gear from having oil buildup zones, which may cause significant needless mass due to the oil flow rate to be discharged.

To that end, it is in particular necessary to have an effective oil recovery device so as to quickly return oil into the lubrication circuit and thus avoid oil retention there, which would increase the quantity of oil present in the circuit and therefore increase its mass.

Generally, as for example described in application FR-A1-2,987,402, a circular oil collection trough is placed around the orifices through which the oil leaving a rotary component is discharged. The walls of these troughs generally prevent lateral projections into the lubrication enclosure. However, they generally do not prevent part of the oil from falling back onto the reduction gear by gravity. This oil can cause excess oil in the reduction gear or be sprayed into the enclosure.

To avoid this, solutions are known, for example described in application FR-A1-3,020,658, to force recovery and avoid spraying, which creates an accumulation of oil in the enclosure before being recovered. The rotation is used to press the oil against the wall of the trough.

However, the rotation makes it more difficult to recover oil at the bottom of the device, since it tends to rise. An oil pocket is therefore created in the trough, and an oil accumulation detrimental to the mass of the system occurs.

There is therefore a need to improve the existing devices so that the oil recovery device around a rotary component, such as an epicyclic reduction gear, for example, contains as little oil as possible and effectively steers a significant oil flow rate toward the lubrication circuit.

SUMMARY

To that end, the embodiments of the present disclosure relate to a device for recovering oil injected by centrifugal effect in a turbine engine. The device comprises a substantially circular ring around an axis. The ring in some embodiments comprises a first part forming a basin surrounding the axis and having an opening turned radially inward, so as to recover the oil injected radially across from the opening, and a second part forming a substantially toroidal chamber, radially open outward in an angular sector surrounding a low point along a direction perpendicular to the axis, so as to allow oil to escape. A passage is arranged between the basin and the chamber substantially over the entire circumference of the ring, so as to cause the oil recovered by the basin to enter the chamber. A rim is also arranged between a radially inner bottom of the chamber and the passage, so as to contain the oil accumulating in this radially inner bottom of the chamber, in particular at a high point opposite the low point.

When the device is placed such that oil is sprayed by centrifugation in the basin, for example by a cover of a reduction gear, this oil is oriented toward the toroidal chamber through the passage arranged between the two, under the effect of its kinetic energy. The walls of the toroidal chamber maintain the oil sprays that may form in the various directions, encountering the walls of the basin, then the chamber. It thus avoids splashes in the recovery enclosure and contains the oil to steer it towards discharge means, such as for example channels, passages, conduits, orifices, etc., and return it into the lubrication circuit. The oil, upon encountering the inner walls of the chamber, condenses thereon and descends by gravity toward the low point, where it is sent toward the discharge orifices of the enclosure.

The presence and configuration of the rim makes it possible to prevent the oil streaming down the side walls of the chamber at the high point, accumulating on the radially inner bottom, from flowing through the passage and falling onto the reduction gear. Thus, all of the oil that escapes by centrifugation across from the basin being captured by the device toward the discharge means, oil falling in the reduction gear is prevented from accumulating therein or being dispersed by its rotary elements in locations of the enclosure where it may accumulate.

In some embodiments, inside the angular sector surrounding the low point, the chamber has a radially outer wall open to allow the oil to flow.

The device having performed its function in the high point, a significant stream of oil can descend and exit the chamber at the angular sector. Closing the passage and opening the radially outer wall of the chamber makes it possible to discharge the oil arriving in the chamber at the low angular sector without there being any reflux of oil from the chamber.

In some embodiments, the basin does not include a fin in the angular sector around the low point. Their presence would instead be bothersome, since they would guide the oil toward a closed wall.

In some embodiments, the positioning of the basin and the chamber is arranged to favor the most direct possible transfer of oil toward the chamber while making the latter a clearly defined volume able to contain the oil sprays and/or mist that forms at the moment of recovery of the oil with a high kinetic energy.

According to alternatives of the presently disclosed technology that may be considered together or separately:

the passage opens in a side wall of the chamber that is substantially transverse relative to the axis, the passage is formed by an opening in a part shared by the basin and the chamber with a side wall substantially transverse relative to the axis, and the basin includes a plurality of fins distributed circumferentially and arranged to steer the oil toward the passage.

In some embodiments, the passage opens onto a wall of the lateral basin in the axial direction, and the fins include a surface that bears on a lateral edge of the basin axially opposite the passage and that rejoins the passage while having an orientation substantially parallel to the axis at the latter.

In this way, the fins, in addition to participating in steering the oil toward the passage, greatly decrease the rotational movement acquired by the oil expelled from the rotating component. In this way, the calming of the oil in the chamber and the downward movement by gravity are favored. In particular, this limits the rising of the oil in the chamber after the low point by driving the rotational movement, and thus decreases the quantity of oil accumulated in the device.

In some embodiments, walls of the chamber extend radially outside the passage. The volume of the chamber is thus increased, and the oil mist is allowed to condense on the larger walls to optimize this phenomenon.

In some embodiments, the chamber includes apertures on a part of its walls that is radially outside the passage.

Indeed, the oil flow rate entering the chamber can compress the air found therein and cause part of the oil to be discharged toward the basin, then to fall onto the reduction gear. In light of the geometry of the device, and due to the fact that the oil arrives radially from the inside, the zone with the highest pressure is generally radially outside; it is therefore in this zone that the apertures are generally most effective to cause the overpressure to drop.

In some embodiments, the apertures are on a part of the side wall situated on the side of the passage. Indeed, the escape through the apertures of oil entering via the passage is minimized, since these apertures are not in the direct path of the oil traversing the passage. In this case, it will instead be oiled air that will drive a residual part of the oil present in the chamber.

In some embodiments, an auxiliary trough communicates with the apertures and is arranged to guide the oil escaping through the apertures toward the low point. Thus, the quantity of residual oil escaping through the apertures is also confined, and prevented from accumulating in the enclosure.

In some embodiments, the device includes a circular casing surrounding the ring and including a flange maintaining the ring, and it is characterized in that the auxiliary trough is formed between the flange and radially outer walls of the ring.

The presently disclosed technology also relates to a turbine engine including a recovery device as previously described, with the device being installed such that the opening of the basin is placed across from the means for discharging oil from a rotary component by centrifugation in a transverse plane, for example a reduction gear with an epicyclic gear train.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 1 schematically shows an axial sectional view of a turbine engine using an embodiment of the presently disclosed technology;

FIG. 2 shows an axially cut perspective view of a reduction gear with an epicyclic gear train affected by an embodiment of the presently disclosed technology;

FIG. 3 schematically shows a cross-sectional view of the operating principle of the reduction gear of FIG. 2 with a device for recovering lubrication oil according to an embodiment of the presently disclosed technology;

FIG. 7 shows an outer cut perspective view of a device for recovering lubrication oil according to an embodiment of the presently disclosed technology at point B of FIG. 3;

FIG. 8 schematically shows an axial sectional view of an alternative of a device according to an embodiment of the presently disclosed technology around point B of FIG. 3; and FIG. 9 schematically shows an axial sectional view along a plane passing through the line D of FIG. 3, of the alternative of FIG. 8.

DETAILED DESCRIPTION

Figure 4:
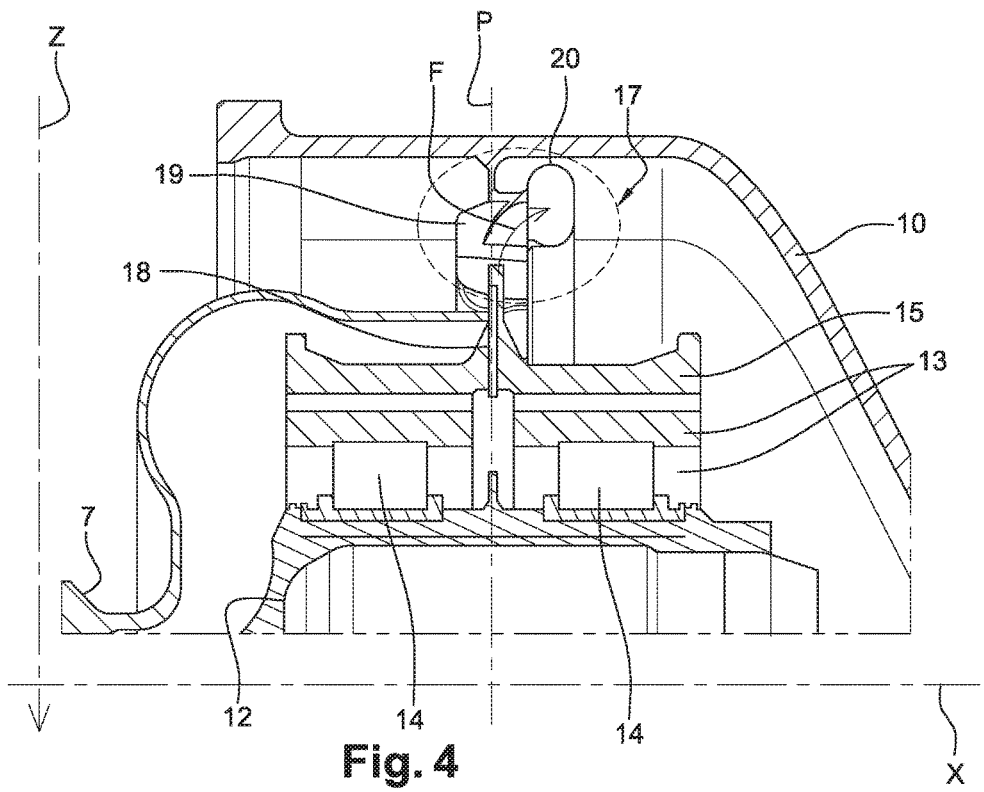
FIG. 4 schematically shows an axial sectional view of a device according to an embodiment of the presently disclosed technology around a point B of FIG. 3.

Embodiments of the present disclosure are described on the basis of specific examples and with reference to the drawings, but such embodiments should not be limited thereby. The drawings described are only schematic and are not limiting. In the drawings, identical or similar elements may have the same reference signs.

In the context of the present disclosure, the terms "first" and "second" are used only to differentiate the different elements and do not imply an order between these elements.

FIG. 1 schematically shows an example turbine engine using an embodiment of the presently disclosed technology. In this example, the turbine engine comprises, from upstream to downstream in the direction of the main flows, a propulsive unit formed by a pair of contra-rotating propellers 1, 2, a gas generator part 3 and a power turbine 4. The power turbine 4, powered by the gas generator 3, drives, via a speed reduction gear device or reduction gear with epicyclic gear train 5 and in a contra-rotating manner, the concentric and coaxial shafts 6 and 7 of the two upstream 1 and downstream 2 propellers, aligned along an axis X. In this example, the gas generator 3 and the turbine 4 are downstream of and slightly off-centered relative to the axis X of the pair of contra-rotating propellers, such that the shaft 8 entering the reduction gear is not directly that 9 of the power turbine, but is driven by the latter via gears, so as to be in the axis X of the propellers. In other examples, the pair of contra-rotating propellers 1, 2 can be found downstream from the turbine 4 and their shafts 6, 7 can be aligned with that 9 of the turbine 4. The reduction gear 5 is also generally contained in one or several casings connected to the stationary structure of the turbine engine that form an enclosure 12 for recovering lubrication oil of the reduction gear 5.

The reduction gear 5 aims to convert the so-called fast rotational speed of the input shaft 8 connected to the power turbine 4 into two separate so-called flow speeds of the two contra-rotating propellers 1, 2. To that end, in reference to FIGS. 2 and 3, the differential reduction gear 5 with epicyclic gear train includes, relative to the longitudinal axis X:

a sun gear 11, in the form of a toothed wheel that is mounted by a cannulated connection on the entering shaft 8, a planet gear carrier 12 secured to the shaft 6 of the upstream propeller 1 of the pair, on which planet gears 13, here five, positioned at 72° relative to one another around the axis X, are mounted by bearings 14, so as to rotate around axes Y connected to the planet gear carrier 12, the planet gears 13 being formed by toothed wheels meshing around the sun gear 11; and a toothed outer annulus gear 15, which meshes with the planet gears 13 and is secured to the shaft 7 of the downstream propeller 2 of the pair.

In reference to FIG. 3, where the elements of the reduction gear 5 are shown schematically, during the operation of the turbine engine, the sun gear 11 is driven at a determined rotation speed $\omega_1$ by the entering shaft 8. By meshing both on the rotating sun gear 11 and the outer annulus gear 15, the planet gears 13 are rotated at a speed $\omega_2$ around the axis Y of their bearing 14 and drive the planet gear carrier 12 in rotation at a speed $\omega_3$ around the axis X. Furthermore, by meshing on the planet gears 13, the outer annulus gear 15 connected to the shaft 7 of the downstream propeller 2 is rotated in a direction opposite that of the planet gear carrier 12 at a speed $\omega_4$. This device distributes the torque provided by the entering shaft 8 between the shafts 6, 7 of the two propellers 1, 2 of the pair in a determined ratio. The value of the rotational speed $\omega_3$ of the planet gear carrier 12 and value of the rotational speed $\omega_4$ of the outer annulus gear 15, in opposite directions, depend on the rating of the turbine engine.

In a known manner, for example, in patent FR-A1-2,955,085 and patent applications FR-A1-2,962,109 and FR-A1-2,940,247, the various gears and bearings of the reduction gear are generally lubricated by a system, not shown, that transfers the oil into the rotating referential of the planet gear carrier 12. As indicated by the arrows referenced F in FIG. 3, the oil is injected into the rotating parts at the meshing of the planet gears 13 with the sun gear 11 and with the outer annulus gear 15, thus, at the bearings 14; the oil is next ejected on the periphery of the outer annulus gear 15 by centrifugation, generally over the entire circumference of the reduction gear 5 around the axis X. The oil is therefore sprayed toward the walls of the recovery enclosure 10, which generally has a substantially circular section around the reduction gear 5 and generally includes a discharge orifice 16 at a low point A of this section, relative to a nominal operation vertical axis Z oriented along the direction of gravity, so as to return the oil having lubricated the reduction gear 5 toward lubrication circuit, not shown.

In order to facilitate the discharge of the oil leaving the reduction gear 5, a recovery device 17 connected to the enclosure 10 surrounds the reduction gear 5 over most of the circumference, with an opening at the low point A to guide the oil toward the discharge orifice 16.

In reference to FIG. 4, schematically showing the high point B of FIG. 3 of the device in axial section, the reduction gear 5 here is arranged so that the oil having lubricated its various elements is guided toward orifices 18 formed in a median transverse plane P of the outer annulus gear 15 and regularly distributed over the circumference. In this way, the lubricating oil is expelled through the orifices 18 with a radial speed corresponding to the centrifugation exerted by the passage in the outer annulus gear 15 and a tangential speed corresponding to the rotational driving at the speed $\omega_4$ in the rotation direction of the outer annulus gear 15.

The recovery device 17, in accordance with an embodiment of the presently disclosed technology, is fastened to the enclosure 10 in the plane P, across from the outlet of the orifices 18 ejecting oil from the outer annulus gear 15. In some embodiments with reference to FIGS. 5 and 6, one can see that this recovery device 17 includes a substantially circular ring made in two parts 19, 20.

Figures 5, 6:
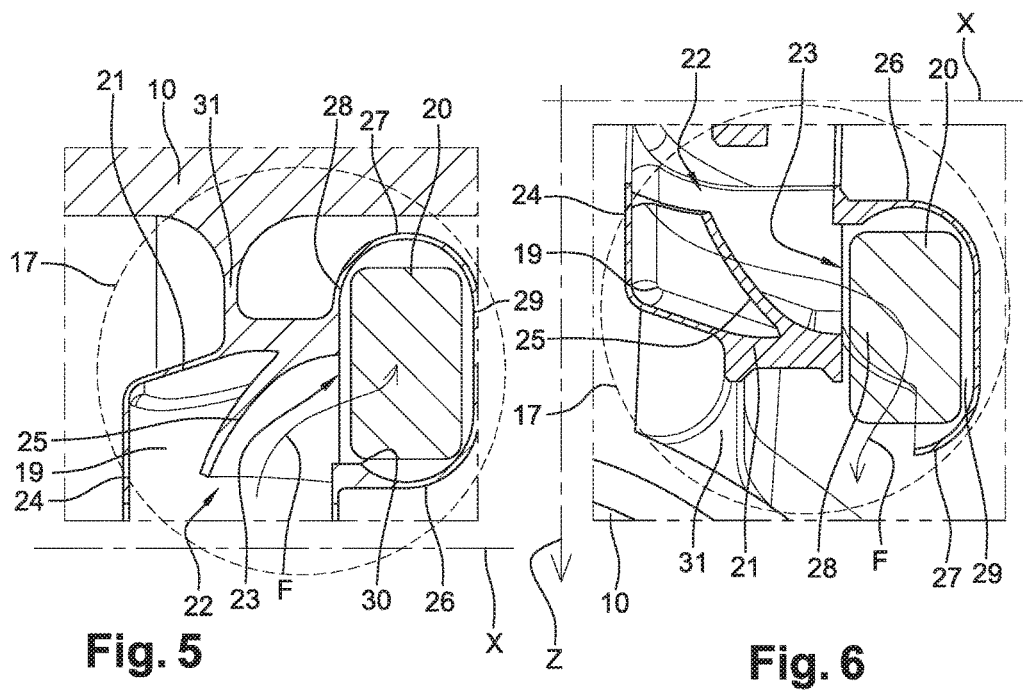
FIG. 5 shows an enlargement of FIG. 4 at the device at point B of FIG. 3.
FIG. 6 schematically shows an axial sectional view along a plane passing through a line D of FIG. 3, of a device according to an embodiment of the presently disclosed technology.

FIG. 5 shows a cross-section of the recovery device 17 at the high point B of FIG. 3, the shape of which is substantially constant over the entire circumference, with the exception of the sector surrounding the low point A, comprised between the radii D and G of FIG. 3. FIG. 6 shows a transverse curve of the recovery device 17 at the entry of this angular sector, at the radius D. The manner in which the recovery device 17 is formed in the angular sector will be provided after having described its shape outside that sector, over the rest of the circumference.

A first part includes a circular basin 19 going around the reduction gear 5. Its bottom 21 is turned radially outward, and its opening 22 is turned radially inward. The circular basin 19 is axially centered around the ejection plane P of the oil around the outer annulus gear 15. Indeed, one can see that the basin 19 is also open at one of its lateral ends in the axial direction to form an annular lateral passage 23 allowing the oil entering through its opening 22 turned toward the orifices 18 (cf. FIG. 4) of the outer annulus gear 15 to be discharged laterally. In some embodiments, the axial sections of the side wall 24, opposite the passage 23, and the axial sections of the bottom 21 of the basin are in the continuation of one another. They form a curve whose radial distance increases continuously from the opening 22 of the basin 19 toward the lateral passage 23, so as to guide the oil toward the lateral passage 23, without forming a threshold at the latter. Furthermore, the part of the side wall formed between the passage 23 and the edge of the basin 19 here is substantially transverse to the axis X, to avoid sending the oil back toward the reduction gear 5.

Furthermore, in reference to FIG. 7, the basin 19 in some embodiments includes a circumferential series of fins 25, for example, regularly spaced apart over the entire circumference. These fins 25 extend radially substantially over the depth of the basin 19, starting from the opening 22 and rejoining the bottom 21, here substantially along a radial direction. Their axial sections therefore form, like for the axial sections of the side wall and the bottom of the basin 19, a curve whose radial distance increases continuously starting from the inner radial edge of each fin 25 toward the lateral passage 23. The fins 25 therefore contribute to guiding the oil toward the passage 23 in an axial plane.

Furthermore, in the circumferential direction, the fins 25 start substantially tangentially to the side wall 24 opposite the passage 23, going up to the latter. The next take a direction substantially parallel to the rotation axis X at their end at the lateral passage 23. In this way, the oil that leaves the orifices 18 at a high rotational speed is effectively steered toward the passage, as indicated by the arrows F in the FIGURES, in particular FIGS. 4 to 7, but its rotation is greatly slowed by the fins 25.

According to FIGS. 5 and 6, the second part of the recovery device 17 is formed by a toroidal chamber 20, axially adjacent to the basin 19 at the lateral passage 23. The radially inner 26 and radially outer 27 bottoms of the toroidal chamber 20 here are curved and connected by substantially planar and transverse side walls 28, 29. The side wall 28 alongside the basin 19 is open at the lateral passage 23.

It will be noted that the inner radius of the annular lateral passage 23 is larger than the minimum radius part of the radially inner bottom 26 of the chamber 20. This difference may not be large, but it is significant, for example around 10% of the radial extension of the chamber 20. In this way, in particular in reference to FIG. 5 showing the section of the device 17 at the high point B, this forms a rim 30 that determines a volume situated radially above the radially inner bottom 26 in which oil can accumulate without falling through the opening 22 of the basin 19.

Furthermore, the chamber 20 extends radially substantially past the lateral passage 23. The difference between its maximum radius and the radially outer edge of the lateral passage 23 here is substantially of the same order of magnitude as the radial extension of the passage 23.

The shape of the chamber 20 makes it possible, for example, to contain and calm the oil. Indeed, the oil leaving the lateral passage 23 in large part forms a mist that condenses into droplets against the walls 29, 27 of the chamber 20. These droplets next stream against the side walls 28, 29 of the chamber 20 in the angular sector surrounding the point B up to the radii D and G of FIG. 3, and, under the effect of gravity, they descend toward the low point A of the chamber 20. Since the chamber 20 is axially offset relative to the basin 19, at the high point B, the oil streaming along the side walls 28, 29 is collected by the inner radial bottom 26 before flowing toward the low point A of the chamber 20. Furthermore, the radially inner rim 30 formed in the chamber 20 at the lateral passage 23 blocks this oil and prevents it from falling onto the reduction gear 5 through the opening 22 of the basin 19. Furthermore, the fins 25, having greatly slowed the oil in the circumferential direction, favor this general vertical movement of the oil toward the low point A, in particular by limiting the driving of the oil upward in the rotation direction $\omega_4$ of the outer annulus gear 15 after the low point A.

In reference to FIG. 6, it will be noted that at the entry of the angular sector surrounding the low point A, at the radii D and G, the chamber 20 is open on the side of the basin 19, radially outside the latter. Preferably, the parts of the walls 29, 27 opposite the lateral passage 23 are open, so as to steer the oil leaving the passage 23 downward toward the discharge orifice 16 of the enclosure 10.

In the low angular sector between the radii D and G, the basin 19 does not include any fins. In a first configuration, it includes the outer radial bottom, and the lateral passage is open. The absence of fins makes it possible not to steer oil coming from the basin toward the chamber in a direction opposite the oil coming from the upper part of the chamber and steered toward the discharge orifice 16 of the enclosure 10. In a second configuration, the basin 19 does not include an outer radial bottom, and its side walls close the lateral passage 23. The toroidal chamber 20 can be absent, or at least its outer radial wall 27 is largely open to allow the oil to flow. In this configuration, the absence of fins in the angular sector allows the oil coming from the bottom of the reduction gear to go freely to the low point of the enclosure. Furthermore, in this sector, the oil arriving in the trough 19 can also escape directly toward the low point A through the open bottom of the latter, without being diverted by fins. Furthermore, the closing of the lateral passage 23 prevents the oil coming from the toroidal chamber 20 from flowing back toward the trough 19, if a large quantity of oil arrives there, or vice versa.

These configurations allow the oil collected in the upper part of the toroidal chamber 20 to fall freely at the low point A through the opening of the chamber 20 in the angular sector surrounding this low point.

The oil falling from the trough 19 and the toroidal chamber at the low point A is collected by the bottom of the enclosure 10 and guided by gravity toward the discharge orifice 16.

FIGS. 8 and 9 show, in the same locations as FIGS. 6 and 7, respectively, additional details for an alternative embodiment in which the general geometry of the device is identical. It will be noted in these FIGURES that the ring 17 is attached to the inner wall of the enclosure 10 by a circular flange 31 at the bottom 21 of the basin 19. On this installation, the radially outer bottom 27 of the toroidal chamber 20 is placed close to the wall of the enclosure 10.

This arrangement forms a circular auxiliary trough 32 between the enclosure 10, a side wall of the flange 31, the bottom 21 of the basin 19 and the side wall 28 of the chamber 20. This auxiliary trough 32 can be open laterally at the pinching between the outer radial bottom 21 of the chamber 20 and the wall of the enclosure 10. It will, however, be noted that because the chamber 20 extends radially past the bottom 21 of the basin 19, the auxiliary trough 32 includes a radially inner bottom, formed substantially by a wall of the outer radial bottom 21 of the basin 19, surrounded on one side by a first transverse wall, formed by the flange 31, and on another side by a second transverse wall, formed by the side wall 28 of the toroidal chamber 20. The flange 31 is missing in the low angular sector between the radii D and G so as not to disrupt the circulation of oil along the low wall of the enclosure 10. Thus, the auxiliary trough 32 disappears in the angular sector surrounding the low point A between the radii D and G, since there is no longer a chamber 20 or bottom 21 of the basin 19. Advantageously at this level, the auxiliary trough 32 communicates directly with the orifice 16 of the enclosure, by continuity with the walls of the latter.

In reference to FIGS. 8 and 9, in one embodiment, the side wall 28 of the toroidal chamber 20 opening onto the auxiliary trough 32 includes one or several circular rows of apertures 33 regularly distributed over the circumference. Of course, as can be seen in FIG. 9, there are no apertures precisely at the low point A, since they are situated at the oil discharge opening formed in the walls 28, 27 of the chamber 20.

The apertures 33 make it possible to avoid jamming of the toroidal calming chamber 20 due to a compression of the air by the oil. The oil, able to escape with the air through these apertures, remains trapped in the auxiliary trough 32 by its side walls and by the enclosure 10, which is radially across from it. Next, through the same gravitational deposition phenomenon as in the calming chamber 20, it flows downward to be collected in the discharge orifice 16 of the enclosure 10.

Various solutions have been described in the case of a reduction gear where the oil is ejected by centrifugation from a rotary cover, here formed by the outer annulus gear 15, which surrounds the reduction gear, but these solutions of course apply to any component where oil is ejected on the periphery by centrifugal effect. It may, for example, adapt to the case described in application FR 1,251,656 of a reduction gear whereof the outer annular gear is stationary, but which is arranged to allow the passage through circumferential slits of a stream of oil driven by a rotating element, the planet gear carrier, and ejected by centrifugal effect.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the disclosure in which an exclusive property or privilege is claimed are defined as follows:

1. A device for recovering oil injected by centrifugal effect in a turbine engine, comprising:
   a substantially circular ring around an axis, the ring comprising a first part forming a basin surrounding the axis and having an opening turned radially inward, so as to recover the oil injected radially across from said opening, and a second part forming a substantially toroidal chamber, radially open outward in an angular sector surrounding a low point along a direction perpendicular to the axis, so as to allow oil to escape;
   a passage arranged between the basin and the chamber substantially over the entire circumference of the ring, so as to cause the oil recovered by the basin to enter the chamber; and
   a rim arranged between a radially inner bottom of the chamber and said passage, so as to contain the oil accumulating in this radially inner bottom of the chamber.

2. The oil recovery device according to claim 1, wherein, inside the angular sector surrounding the low point, the chamber has a radially outer wall open to allow the oil to flow.

3. The oil recovery device according to claim 1, wherein the passage is formed by an opening in a part shared by the basin and the chamber with a side wall substantially transverse relative to the axis.

4. The oil recovery device according to claim 1, wherein the basin includes a plurality of fins distributed circumferentially and arranged to steer the oil toward the passage.

5. The oil recovery device according to claim 4, wherein the passage opens onto a wall of the lateral basin in the axial direction, and the fins include a surface that bears on a lateral edge of the basin axially opposite the passage and that rejoins the passage while having an orientation substantially parallel to the axis at the latter.

6. The oil recovery device according to claim 1, wherein walls of the chamber extend radially outside said passage.

7. The oil recovery device according to claim 1, wherein the chamber includes apertures on a part of its walls that is radially outside the passage.

8. The oil recovery device according to claim 7, further comprising an auxiliary trough communicating with said apertures and arranged to guide the oil escaping through the apertures toward the low point.

9. The oil recovery device according to claim 8, further comprising a circular casing surrounding the ring and including a flange maintaining the ring, the auxiliary trough being formed between the flange and radially outer walls of the ring.

10. A turbine engine including an oil recovery device according to claim 1, the device being installed such that the opening of the basin is placed across from a means for discharging oil from a rotary component by centrifugation in a transverse plane.

11. A turbine engine including an oil recovery device according to claim 1, the device being installed such that the opening of the basin is placed across from a discharge orifice configured to discharge oil from a rotary component by centrifugation in a transverse plane.

12. The oil recovery device according to claim 1, wherein the rim arranged at a high point opposite the low point.

* * * * *